US012548576B2

United States Patent
Pihlajakuja et al.

(10) Patent No.: US 12,548,576 B2
(45) Date of Patent: Feb. 10, 2026

(54) REDUCTION OF SPATIAL AUDIO PARAMETERS

(71) Applicant: Nokia Technologies Oy, Espoo (FI)

(72) Inventors: Tapani Pihlajakuja, Kellokoski (FI); Mikko-Ville Laitinen, Espoo (FI); Lasse Juhani Laaksonen, Tampere (FI); Adriana Vasilache, Tampere (FI); Anssi Rämö, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 298 days.

(21) Appl. No.: 17/998,992

(22) PCT Filed: Apr. 15, 2021

(86) PCT No.: PCT/FI2021/050274
§ 371 (c)(1),
(2) Date: Nov. 16, 2022

(87) PCT Pub. No.: WO2021/250312
PCT Pub. Date: Dec. 16, 2021

(65) Prior Publication Data
US 2023/0178085 A1 Jun. 8, 2023

(30) Foreign Application Priority Data
Jun. 9, 2020 (GB) ..................... 2008664

(51) Int. Cl.
*G10L 19/008* (2013.01)
*G10L 19/02* (2013.01)
(Continued)

(52) U.S. Cl.
CPC ........ *G10L 19/008* (2013.01); *G10L 19/0204* (2013.01); *G10L 25/18* (2013.01);
(Continued)

(58) Field of Classification Search
CPC ....... G10L 19/00; G10L 19/008; G10L 19/02; G10L 19/0204; G10L 19/002;
(Continued)

(56) References Cited

U.S. PATENT DOCUMENTS 9,899,031 B1* 2/2018 Jeong ................... G10L 19/008
11,942,097 B2* 3/2024 McGrath .............. G10L 19/008
(Continued)

FOREIGN PATENT DOCUMENTS

| CN | 101499279 B | 11/2011 |
|----|-------------|---------|
| GB | 2577698 A | 4/2020 |

(Continued)

OTHER PUBLICATIONS

"Description of the IVAS MASA C Reference Software", 3GPP TSG-SA4#106 meeting, S4-191167, Agenda: 7.5, Nokia Corporation, Oct. 21-25, 2019, pp. 1-16.
(Continued)

*Primary Examiner* — Leshui Zhang
(74) *Attorney, Agent, or Firm* — ALSTON & BIRD LLP

(57) ABSTRACT

There is inter alia disclosed an apparatus for spatial audio encoding comprising: means for analysing a plurality of spatial audio parameter sets associated with a frame of one or more audio signals, wherein the plurality of spatial audio parameter sets are associated with a plurality of subframes, a plurality of frequency sub bands and a plurality of sound source directions for the frame of the one or more audio signals; and means for determining from the analysis of the plurality of spatial audio parameter sets at least one spatial audio parameter set for subframes of the frame of the one or more audio signals.

5 Claims, 4 Drawing Sheets

(51) Int. Cl.
*G10L 25/18* (2013.01)
*G10L 25/21* (2013.01)
*H04S 3/00* (2006.01)
*H04S 7/00* (2006.01)

(52) U.S. Cl.
CPC ............... *G10L 25/21* (2013.01); *H04S 7/30* (2013.01); *H04S 3/008* (2013.01); *H04S 2400/01* (2013.01); *H04S 2400/11* (2013.01); *H04S 2420/03* (2013.01); *H04S 2420/07* (2013.01)

(58) Field of Classification Search
CPC ... G10L 19/022; G10L 19/012; G10L 19/005; G10L 19/0017; G10L 19/08; G10L 25/18; G10L 25/21; H04S 7/30; H04S 7/00; H04S 7/303; H04S 7/304; H04S 3/008; H04S 3/00; H04S 3/02; H04S 2400/11; H04S 2420/03; H04S 2420/07; H04R 3/005; H04R 3/04
USPC ................................. 704/500–504; 381/1–23
See application file for complete search history.

(56) References Cited

U.S. PATENT DOCUMENTS

| | | |
|---|---|---|
| 2009/0219182 A1 | 9/2009 | Pang et al. |
| 2012/0232910 A1* | 9/2012 | Dressler ............... H04S 3/02 704/500 |
| 2014/0219459 A1 | 8/2014 | Daniel et al. |
| 2014/0233762 A1* | 8/2014 | Vilkamo ............... G10H 1/183 381/119 |
| 2014/0355769 A1 | 12/2014 | Peters et al. |
| 2015/0332680 A1* | 11/2015 | Crockett ............... G10L 19/20 381/23 |
| 2018/0240470 A1* | 8/2018 | Wang ............... G10L 19/008 |
| 2020/0265851 A1* | 8/2020 | Fuchs ............... G10L 19/00 |
| 2021/0377685 A1* | 12/2021 | Laitinen ............... H04S 3/02 |

FOREIGN PATENT DOCUMENTS

| | | | |
|---|---|---|---|
| WO | 2014/099285 A1 | 6/2014 | |
| WO | 2016/133785 A1 | 8/2016 | |
| WO | 2017/005978 A1 | 1/2017 | |
| WO | 2018/091776 A1 | 5/2018 | |
| WO | 2019/097018 A1 | 5/2019 | |
| WO | WO-2019086757 A1 * | 5/2019 | ........... G10L 19/008 |
| WO | 2019/149845 A1 | 8/2019 | |
| WO | 2019/229299 A1 | 12/2019 | |
| WO | 2019/234290 A1 | 12/2019 | |
| WO | 2020/008105 A1 | 1/2020 | |
| WO | 2020/089510 A1 | 5/2020 | |
| WO | 2020/089523 A1 | 5/2020 | |
| WO | 2020/193865 A1 | 10/2020 | |
| WO | 2021/130404 A1 | 7/2021 | |
| WO | 2021/130405 A1 | 7/2021 | |
| WO | 2021/136879 A1 | 7/2021 | |

OTHER PUBLICATIONS

"Proposal for MASA common metadata and metadata structure", 3GPP TSG-SA4#101 meeting, S4-181353, Agenda: 7.5, Nokia Corporation, Nov. 19-23, 2018, pp. 1-4.
Search Report received for corresponding United Kingdom Patent Application No. 2008664.1, dated Nov. 26, 2020, 4 pages.
International Search Report and Written Opinion received for corresponding Patent Cooperation Treaty Application No. PCT/FI2021/050274, dated Sep. 7, 2021, 24 pages.
Yang et al., "Multi-channel Object-Based Spatial Parameter Compression Approach for 3D Audio", Pacific Rim Conference on Multimedia, 2015, pp. 354-364.
Office action received for corresponding Indian Patent Application No. 202347000400, dated Feb. 15, 2023, 7 pages.
Partial European Search Report received for corresponding European Patent Application No. 21821251.2, dated May 28, 2024, 16 pages.
Extended European Search Report received for corresponding European Patent Application No. 21821251.2, dated Sep. 9, 2024, 17 pages.
Hearing Notice for Indian Application No. 202347000400 dated Jun. 19, 2025, 2 pages.

* cited by examiner

REDUCTION OF SPATIAL AUDIO PARAMETERS

RELATED APPLICATION

This application claims priority to PCT Application No. PCT/FI2021/050274, filed on Apr. 15, 2021, which claims priority to GB Application No. 2008664.1, filed on Jun. 9, 2020, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance, etc.) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field. Furthermore, the analysis of higher-order Ambisonics (HOA) input for multi-direction spatial metadata extraction has also been documented in the scientific literature related to higher-order directional audio coding (HO-DirAC).

A further input for the encoder is also multi-channel loudspeaker input, such as 5.1 or 7.1 channel surround inputs and audio objects.

However, with respect to the components of the spatial metadata the compression and encoding of the spatial audio parameters is of considerable interest in order to minimise the overall number of bits required to represent the spatial audio parameters.

SUMMARY

There is according to a first aspect an apparatus for spatial audio encoding comprising: means for analysing a plurality of spatial audio parameter sets associated with a frame of one or more audio signals, wherein the plurality of spatial audio parameter sets are associated with a plurality of subframes, a plurality of frequency sub bands and a plurality of sound source directions for the frame of the one or more audio signals; and means for determining from the analysis of the plurality of spatial audio parameter sets at least one spatial audio parameter set for subframes of the frame of the one or more audio signals.

The means for determining from the analysis of the plurality of spatial audio parameter sets at least one spatial audio parameter set for subframes of the frame of the one or more audio signals may comprise: means for determining that a first spatial audio parameter set for a first subframe of the frame and a second spatial audio parameter sets for a second subframe of the frame of the one or more audio signals are similar; and means for selecting one of the first or second spatial audio parameter sets as a spatial audio parameter set for the first and second subframe of the frame.

The means for determining from the analysis of the plurality of spatial audio parameter sets at least one spatial audio parameter set for subframes of the frame of the one or more audio signals may further comprises: means for allocating a further number of spatial audio parameter sets from the plurality of spatial audio parameter sets for the frequency sub bands of the frame from an initial number of spatial audio parameter sets for the frequency sub bands of the frame.

The frame may have allocated a first audio source direction, wherein the apparatus further may comprise means for determining a validity of a further sound source direction for the frame; and means for allocating a further sound source direction for the frame dependent on the validity.

Each frequency sub band of the frame and each sub frame of the frame may each form a time frequency tile of the frame, wherein the means for determining the validity of a further sound source direction for the frame may comprise: means for determining that a direct-to-total energy ratio value corresponding to the further audio source direction is substantially larger than zero for each time frequency tile of the frame; and wherein the means for allocating a further sound source direction for the frame dependent on the validity may comprise means for allocating the further sound source direction for each time frequency tile of the frame.

The means for analysing a plurality of spatial audio parameter sets associated with a frame of one or more audio signals may comprise: means for comparing a first spatial audio parameter set to a second spatial audio parameter set for similarity.

The means for comparing the first spatial audio parameter set to a second spatial audio parameter for similarity may comprise means for comparing each parameter in turn of the first spatial audio parameter set to each parameter in turn of the second spatial audio parameter set in order to whether each parameter in turn from the first spatial audio parameter set is the same value as each parameter in turn from the second spatial audio parameter set.

The means for comparing the first spatial audio parameter set to a second spatial audio parameter for similarity may comprise means for comparing each parameter in turn of the first spatial audio parameter set to each parameter in turn of the second spatial audio parameter set in order to whether each parameter in turn from the first spatial audio parameter set is the same within a defined tolerance as each parameter in turn from the second spatial audio parameter set.

Parameters of the first or the second of the at least two spatial audio parameter sets may comprise at least one of: a direction vector comprising an azimuth value and an elevation value; a direct-to-total energy ratio; a surrounding coherence value; and a spread coherence.

The means for determining from the analysis of the plurality of spatial audio parameter sets at least one spatial audio parameter set for subframes of the frame of the one or more audio signals may be dependent on a target coding rate.

The initial number of spatial audio parameter sets for the frequency sub bands of the frame may be dependent on the target coding rate.

There is according to a second aspect a method for spatial audio encoding comprising: analysing a plurality of spatial audio parameter sets associated with a frame of one or more audio signals, wherein the plurality of spatial audio parameter sets are associated with a plurality of subframes, a plurality of frequency sub bands and a plurality of sound source directions for the frame of the one or more audio signals; and determining from the analysis of the plurality of spatial audio parameter sets at least one spatial audio parameter set for subframes of the frame of the one or more audio signals.

Determining from the analysis of the plurality of spatial audio parameter sets at least one spatial audio parameter set for subframes of the frame of the one or more audio signals may comprise: determining that a first spatial audio parameter set for a first subframe of the frame and a second spatial audio parameter sets for a second subframe of the frame of the one or more audio signals are similar; and selecting one of the first or second spatial audio parameter sets as a spatial audio parameter set for the first and second subframe of the frame.

Determining from the analysis of the plurality of spatial audio parameter sets at least one spatial audio parameter set for subframes of the frame of the one or more audio signals may further comprise: allocating a further number of spatial audio parameter sets from the plurality of spatial audio parameter sets for the frequency sub bands of the frame from an initial number of spatial audio parameter sets for the frequency sub bands of the frame.

The frame has allocated a first audio source direction, wherein the method may further comprise: determining a validity of a further sound source direction for the frame; and allocating a further sound source direction for the frame dependent on the validity.

Each frequency sub band of the frame and each sub frame of the frame each form a time frequency tile of the frame, wherein determining the validity of a further sound source direction for the frame may comprise: determining that a direct-to-total energy ratio value corresponding to the further audio source direction is substantially larger than zero for each time frequency tile of the frame; and wherein allocating a further sound source direction for the frame dependent on the validity comprises means allocating the further sound source direction for each time frequency tile of the frame.

Analysing a plurality of spatial audio parameter sets associated with a frame of one or more audio signals may comprise comparing a first spatial audio parameter set to a second spatial audio parameter set for similarity.

Comparing the first spatial audio parameter set to a second spatial audio parameter for similarity may comprise comparing each parameter in turn of the first spatial audio parameter set to each parameter in turn of the second spatial audio parameter set in order to whether each parameter in turn from the first spatial audio parameter set is the same value as each parameter in turn from the second spatial audio parameter set.

Comparing the first spatial audio parameter set to a second spatial audio parameter for similarity may comprise comparing each parameter in turn of the first spatial audio parameter set to each parameter in turn of the second spatial audio parameter set in order to whether each parameter in turn from the first spatial audio parameter set is the same within a defined tolerance as each parameter in turn from the second spatial audio parameter set.

Parameters of the first or the second of the at least two spatial audio parameter sets may comprise at least one of: a direction vector comprising an azimuth value and an elevation value; a direct-to-total energy ratio; a surrounding coherence value; and a spread coherence.

Determining from the analysis of the plurality of spatial audio parameter sets at least one spatial audio parameter set for subframes of the frame of the one or more audio signals may be dependent on a target coding rate.

The initial number of spatial audio parameter sets for the frequency sub bands of the frame may be dependent on the target coding rate.

According to a third aspect there is an apparatus for spatial audio encoding comprising at least one processor and at least one memory including computer program code, the at least one memory and the computer program code configured to, with the at least one processor, cause the apparatus to at least to analyse a plurality of spatial audio parameter sets associated with a frame of one or more audio signals, wherein the plurality of spatial audio parameter sets are associated with a plurality of subframes, a plurality of frequency sub bands and a plurality of sound source directions for the frame of the one or more audio signals; and determine from the analysis of the plurality of spatial audio parameter sets at least one spatial audio parameter set for subframes of the frame of the one or more audio signals.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
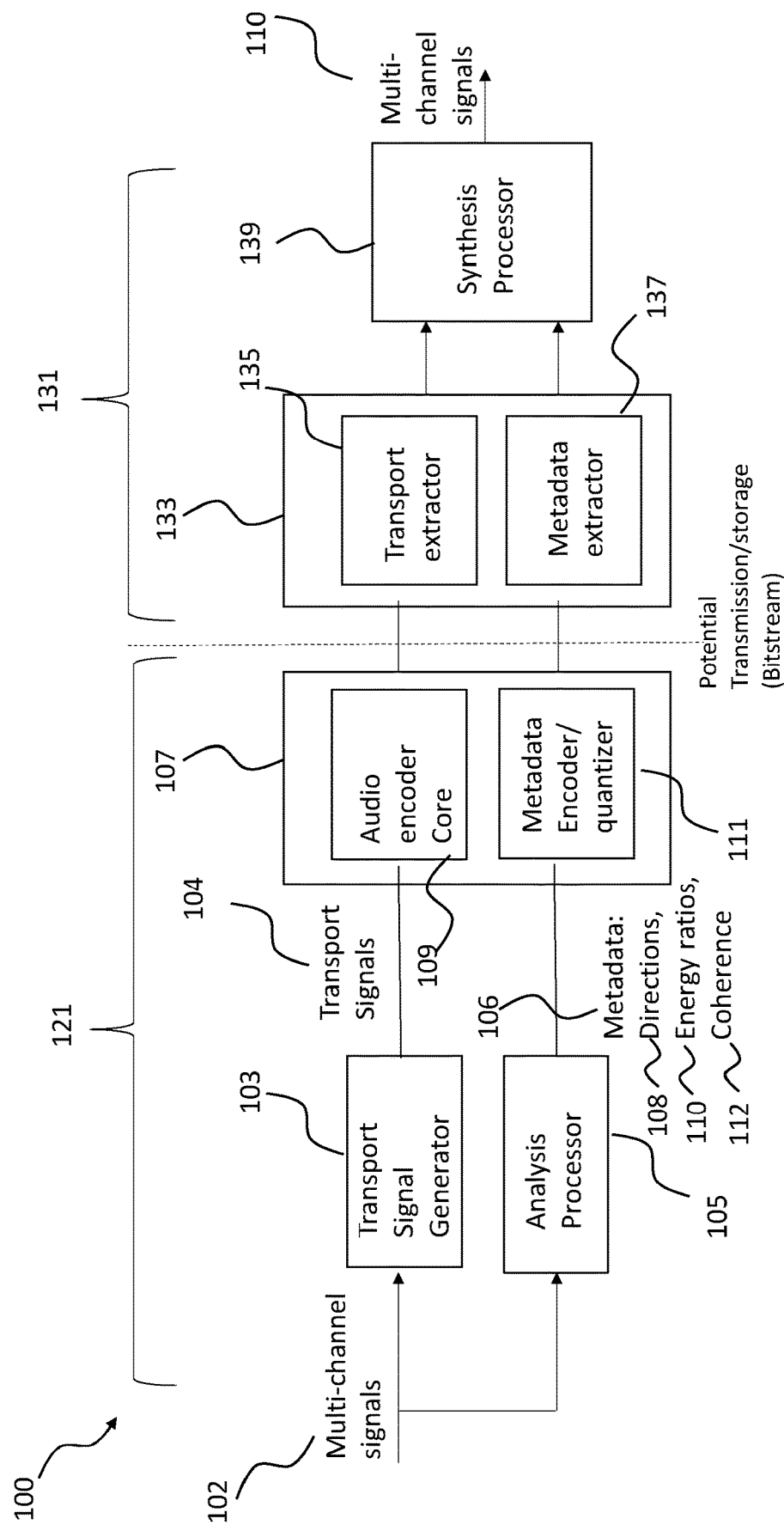
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA), etc. It is understood that in some embodiments the channel location is based on a location of the microphone or is a virtual location or direction. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals. Such a system is currently being standardised by the 3GPP standardization body as the Immersive Voice and Audio Service (IVAS). IVAS is intended to be an extension to the existing 3GPP Enhanced Voice Service (EVS) codec in order to facilitate immersive voice and audio services over existing and future mobile (cellular) and fixed line networks. An application of IVAS may be the provision of immersive voice and audio services over 3GPP fourth generation (4G) and fifth generation (5G) networks. In addition, the IVAS codec as an extension to EVS may be used in store and forward applications in which the audio and speech content is encoded and stored in a file for playback. It is to be appreciated that IVAS may be used in conjunction with other audio and speech coding technologies which have the functionality of coding the samples of audio and speech signals.

The metadata may consist of at least of spherical directions (elevation, azimuth), at least one energy ratio of a resulting direction, a spread coherence, and surround coherence independent of the direction, for each considered time-frequency (TF) block or tile, in other words a time/frequency sub band. In total IVAS may have a number of different types of metadata parameters for each time-frequency (TF) tile. The types of spatial audio parameters which can make up the metadata for IVAS are shown in Table 1 below.

This data may be encoded and transmitted (or stored) by the encoder in order to be able to reconstruct the spatial signal at the decoder.

Moreover, in some instances metadata assisted spatial audio (MASA) may support up to 2 directions for each TF tile which would require the above parameters to be encoded and transmitted for each direction on a per TF tile basis. Thereby potentially doubling the required bit rate according to Table 1.

| Field | Bits | Description |
| --- | --- | --- |
| Direction index | 16 | Direction of arrival of the sound at a time-frequency parameter interval. Spherical representation at about 1-degree accuracy. Range of values: "covers all directions at about 1° accuracy" |
| Direct-to-total energy ratio | 8 | Energy ratio for the direction index (i.e., time-frequency subframe). Calculated as energy in direction/total energy. Range of values: [0.0, 1.0] |
| Spread coherence | 8 | Spread of energy for the direction index (i.e., time-frequency subframe). Defines the direction to be reproduced as a point source or coherently around the direction. Range of values: [0.0, 1.0] |
| Diffuse-to-total energy ratio | 8 | Energy ratio of non-directional sound over surrounding directions. Calculated as energy of non-directional sound/total energy. Range of values: [0.0, 1.0] (Parameter is independent of number of directions provided.) |
| Surround coherence | 8 | Coherence of the non-directional sound over the surrounding directions. Range of values: [0.0, 1.0] (Parameter is independent of number of directions provided.) |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) |
| Distance | 8 | Distance of the sound originating from the direction index (i.e., time-frequency subframes) in meters on a logarithmic scale. Range of values: for example, 0 to 100 m. (Feature intended mainly for future extensions, e.g., 6DoF audio.) |

This data may be encoded and transmitted (or stored) by the encoder in order to be able to reconstruct the spatial signal at the decoder.

The bitrate allocated for metadata in a practical immersive audio communications codec may vary greatly. Typical overall operating bitrates of the codec may leave only 2 to 10 kbps for the transmission/storage of spatial metadata. However, some further implementations may allow up to 30 kbps or higher for the transmission/storage of spatial metadata. The encoding of the direction parameters and energy ratio components has been examined before along with the encoding of the coherence data. However, whatever the transmission/storage bit rate assigned for spatial metadata there will always be a need to use as few bits as possible to represent these parameters especially when a TF tile may support multiple directions corresponding to different sound sources in the spatial audio scene.

The concept as discussed hereafter is to encode the metadata spatial audio parameters by either reducing the number of sets of spatial parameters across a number of frequency bands of a time subframe and/or by reducing the number of sets of spatial audio parameters across a number of time sub frames of a frame and/or frequency sub bands of a frequency band and/or by reducing the number sets of spatial audio parameters associated with the multiple directions on a TF tile basis.

Accordingly, the invention proceeds from the consideration that the bit rate required for transmitting the MASA data (or spatial metadata spatial audio parameters) may be reduced by having a reduced number of sets of spatial audio parameters over the course of a time frame and/or across frequency sub bands of a frequency band and/or number of sound source direction on a TF tile basis.

In this regard, FIG. 1 depicts an example apparatus and system for implementing embodiments of the application. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial metadata associated with the audio signals may be provided to an encoder as a separate bit-stream. In some embodiments the spatial metadata may be provided as a set of spatial (direction) index values. These are examples of a metadata-based audio input format.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters may in some embodiments be considered to be spatial audio parameters. In other words, the spatial audio parameters comprise parameters which aim to characterize the soundfield created/captured by the multi-channel signals (or two or more audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly, the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the metadata.

Therefore, in summary first the system (analysis part) is configured to receive multi-channel audio signals.

Then the system (analysis part) is configured to generate a suitable transport audio signal (for example by selecting or downmixing some of the audio signal channels) and the spatial audio parameters as metadata.

The system is then configured to encode for storage/transmission the transport signal and the metadata.

After this the system may store/transmit the encoded transport signal and metadata.

The system may retrieve/receive the encoded transport signal and metadata.

Then the system is configured to extract the transport signal and metadata from encoded transport signal and metadata parameters, for example demultiplex and decode the encoded transport signal and metadata parameters.

The system (synthesis part) is configured to synthesize an output multi-channel audio signal based on extracted transport audio signals and metadata.

Figure 2:
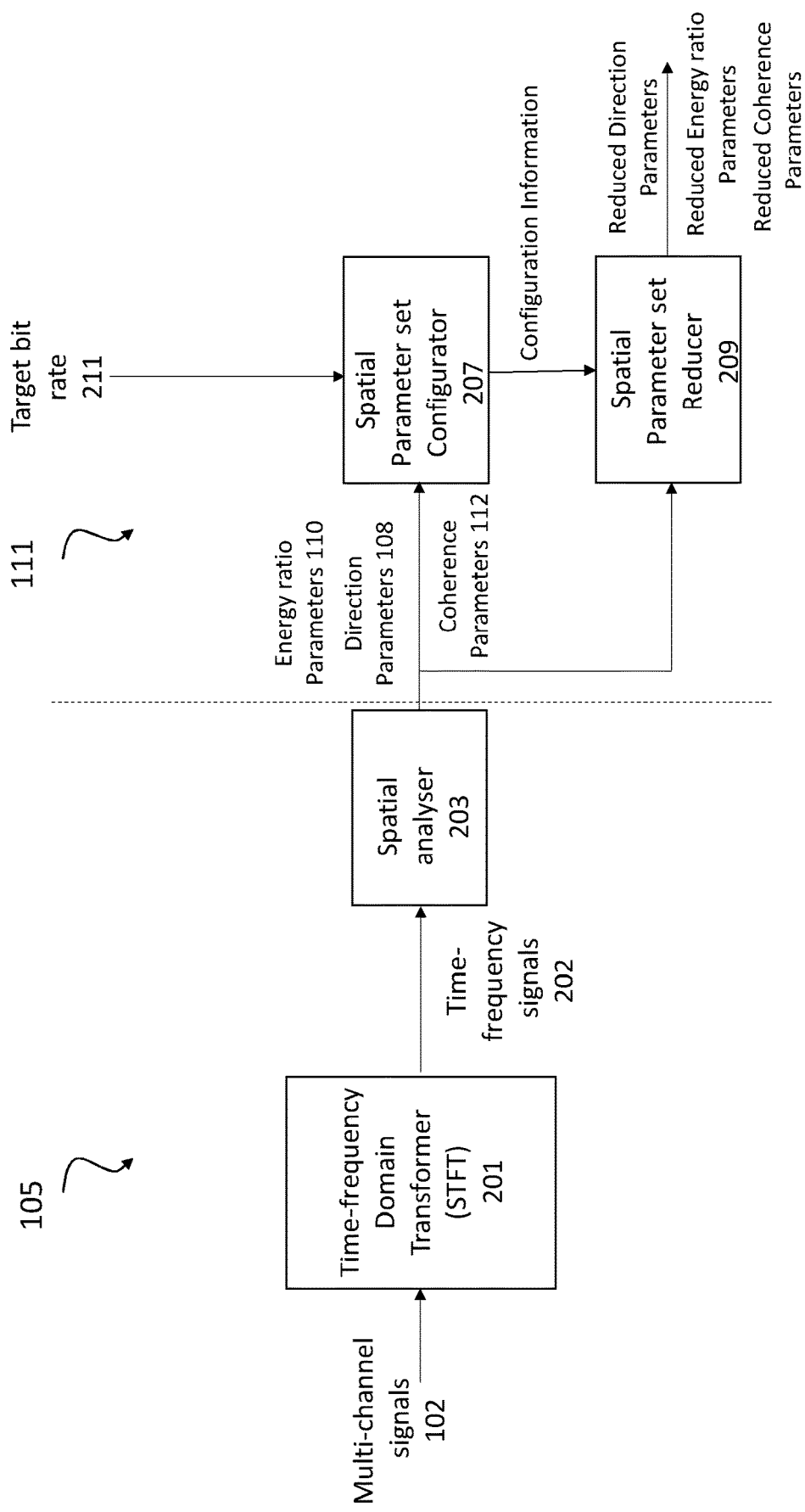
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

FIGS. 1 and 2 depict the Metadata encoder/quantizer 111 and the analysis processor 105 as being coupled together. However, it is to be appreciated that some embodiments may not so tightly couple these two respective processing entities such that the analysis processor 105 can exist on a different device from the Metadata encoder/quantizer 111. Consequently, a device comprising the Metadata encoder/quantizer 111 may be presented with the transport signals and metadata streams for processing and encoding independently from the process of capturing and analysing.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example, the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$. The widths of the sub bands can approximate any suitable distribution. For example, the Equivalent rectangular bandwidth (ERB) scale or the Bark scale.

A time frequency (TF) tile (or block) is thus a specific sub band within a subframe of the frame.

It can be appreciated that the number of bits required to represent the spatial audio parameters may be dependent at least in part on the TF (time-frequency) tile resolution (i.e., the number of TF subframes or tiles). For example, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution. For example, if each TF tile were to be encoded according to the distribution of Table 1 above then each TF tile would require 64 bits (for one sound source direction per TF tile) and 104 bits (for two sound source directions per TF tile, taking into account parameters which are independent of the sound source direction).

Embodiments aim to reduce the number of bits on a per frame basis by reducing the number of sets of spatial audio parameters over the frame, whether that be by reducing the number of sets of spatial audio parameters over a number of sub frames, or by reducing the number of sets of spatial audio parameters over frequency sub bands over the frequency band, or by reducing the number of sets of spatial audio parameters over sound source directions per TF tile.

In embodiments the analysis processor 105 may comprise a spatial analyser 203. The spatial analyser 203 may be configured to receive the time-frequency signals 202 and based on these signals estimate direction parameters 108. The direction parameters may be determined based on any audio based 'direction' determination.

For example, in some embodiments the spatial analyser 203 is configured to estimate the direction of a sound source with two or more signal inputs.

The spatial analyser 203 may thus be configured to provide at least one azimuth and elevation for each frequency band and temporal time-frequency block within a frame of an audio signal, denoted as azimuth φ(k,n), and elevation θ(k,n). The direction parameters 108 for the time sub frame may be also be passed to the spatial parameter set configurator 207.

The spatial analyser 203 may also be configured to determine an energy ratio parameter 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In embodiments the direct-to-total energy ratio parameter can be estimated based on the normalized cross-correlation parameter cor'(k,n) between a microphone pair at band k, the value of the cross-correlation parameter lies between −1 and 1. The direct-to-total energy ratio parameter r(k,n) can be determined by comparing the normalized cross-correlation parameter to a diffuse field normalized cross correlation parameter cor'$_D$(k,n) as $$r(k, n) = \frac{cor'(k, n) - cor'_D(k, n)}{1 - cor'_D(k, n)}.$$

The direct-to-total energy ratio is explained further in PCT publication WO2017/005978 which is incorporated herein by reference. The energy ratio may be passed to the spatial parameter configurator 207.

The spatial analyser 203 may furthermore be configured to determine a number of coherence parameters 112 which may include surrounding coherence (γ(k,n)) and spread coherence (ζ(k,n)), both analysed in time-frequency domain.

Each of the aforementioned coherence parameters are next discussed. All the processing is performed in the time-frequency domain, so the time-frequency indices k and n are dropped where necessary for brevity.

Let us first consider the situation where the sound is reproduced coherently using two spaced loudspeakers (e.g., front left and right) instead of a single loudspeaker. The coherence analyser may be configured to detect that such a method has been applied in surround mixing.

It is to be understood that the following sections explain the analysis of the spread and surround coherences in terms of a multichannel loudspeaker signal input. However, similar practices can be applied when the input comprises the microphone array as input.

In some embodiments therefore the spatial analyser 203 may be configured to calculate, the covariance matrix C for the given analysis interval consisting of one or more time indices n and frequency bins b. The size of the matrix is $N_L \times N_L$, and the entries are denoted as $c_{ij}$, where $N_L$ is the number of loudspeaker channels, and i and j are loudspeaker channel indices.

Next, the spatial analyser 203 may be configured to determine the loudspeaker channel $i_c$ closest to the estimated direction (which in this example is azimuth θ).

$$i_c = \arg(\min(|\theta - \alpha_i|))$$

where $\alpha_i$ is the angle of the loudspeaker i.

Furthermore, in such embodiments the spatial analyser 203 is configured to determine the loudspeakers closest on the left $i_l$ and the right $i_r$ side of the loudspeaker $i_c$.

A normalized coherence between loudspeakers i and j is denoted as $$c'_{ij} = \frac{|c_{ij}|}{\sqrt{|c_{ii} c_{jj}|}},$$

using this equation, the spatial analyser 203 may be configured to calculate a normalized coherence $c'_{lr}$ between $i_l$ and $i_r$. In other words, calculate $$c'_{lr} = \frac{|c_{lr}|}{\sqrt{|c_{ll} c_{rr}|}}.$$

Furthermore, the spatial analyser 203 may be configured to determine the energy of the loudspeaker channels i using the diagonal entries of the covariance matrix $$E_i = c_{ii},$$

and determine a ratio between the energies of the $i_l$ and $i_r$ loudspeakers and $i_l$, $i_r$, and $i_c$ loudspeakers as $$\xi_{lr/lrc} = \frac{E_l + E_r}{E_l + E_r + E_c}.$$

The spatial analyser 203 may then use these determined variables to generate a 'stereoness' parameter $$\mu = c'_{lr} \xi_{lr/lrc}.$$

This 'stereoness' parameter has a value between 0 and 1. A value of 1 means that there is coherent sound in loudspeakers $i_l$ and $i_r$ and this sound dominates the energy of this sector. The reason for this could, for example, be the loudspeaker mix used amplitude panning techniques for creating an "airy" perception of the sound. A value of 0 means that no such techniques has been applied, and, for example, the sound may simply be positioned to the closest loudspeaker.

Furthermore, the spatial analyser 203 may be configured to detect, or at least identify, the situation where the sound is reproduced coherently using three (or more) loudspeakers for creating a "close" perception (e.g., use front left, right and centre instead of only centre). This may be because a soundmixing engineer produces such a situation in surround mixing the multichannel loudspeaker mix.

In such embodiments the same loudspeakers $i_l$, $i_r$, and $i_c$ identified earlier are used by the coherence analyser to determine normalized coherence values $c'_{cl}$ and $c'_{cr}$ using the normalized coherence determination discussed earlier. In other words the following values are computed:

$$c'_{cl} = \frac{|c_{cl}|}{\sqrt{|c_{cc} c_{ll}|}}, \quad c'_{cr} = \frac{|c_{cr}|}{\sqrt{|c_{cc} c_{rr}|}}.$$

The spatial analyser 203 may then determine a normalized coherence value $c'_{clr}$ depicting the coherence among these loudspeakers using the following:

$$c'_{clr} = \min(c'_{cl}, c'_{cr}).$$

In addition, the spatial analyser 203 may be configured to determine a parameter that depicts how evenly the energy is distributed between the channels $i_l$, $i_r$, and $i_c$, $$\xi_{clr} = \min\left(\frac{E_l}{E_c}, \frac{E_c}{E_l}, \frac{E_r}{E_c}, \frac{E_c}{E_r}\right).$$

Using these variables, the spatial analyser 203 may determine a new coherent panning parameter κ as, $$\kappa = c'_{clr} \xi_{clr}.$$

This coherent panning parameter κ has values between 0 and 1. A value of 1 means that there is coherent sound in all loudspeakers $i_l$, $i_r$, and $i_c$, and the energy of this sound is evenly distributed among these loudspeakers. The reason for this could, for example, be because the loudspeaker mix was generated using studio mixing techniques for creating a perception of a sound source being closer. A value of 0 means that no such technique has been applied, and, for example, the sound may simply be positioned to the closest loudspeaker.

The spatial analyser 203 determined "stereoness" parameter μ which measures the amount of coherent sound in $i_l$ and $i_r$ (but not in $i_c$), and coherent panning parameter κ which measures the amount of coherent sound in all $i_l$, $i_r$, and $i_c$ is configured to use these to determine coherence parameters to be output as metadata.

Thus, the spatial analyser 203 is configured to combine the "stereoness" parameter μ and coherent panning parameter κ to form a spread coherence ζ parameter, which has values from 0 to 1. A spread coherence ζ value of 0 denotes a point source, in other words, the sound should be reproduced with as few loudspeakers as possible (e.g., using only the loudspeaker $i_c$). As the value of the spread coherence ζ increases, more energy is spread to the loudspeakers around the loudspeaker $i_c$; until at the value 0.5, the energy is evenly spread among the loudspeakers $i_l$, $i_r$, and $i_c$. As the value of spread coherence ζ increases over 0.5, the energy in the loudspeaker $i_c$ is decreased; until at the value 1, there is no energy in the loudspeaker $i_c$, and all the energy is at loudspeakers $i_l$ and $i_r$.

Using the aforementioned parameters μ and κ, the spatial analyser 203 is configured in some embodiments to determine a spread coherence parameter ζ, using the following expression:

$$\zeta = \begin{cases} \max(0.5, \mu - \kappa + 0.5), & \text{if } \max(\mu, \kappa) > 0.5 \,\&\, \kappa > \mu \\ \max(\mu, \kappa), & \text{else} \end{cases}.$$

The above expression is an example only and it should be noted that the spatial analyser 203 may estimate the spread coherence parameter ζ in any other way as long as it complies with the above definition of the parameter.

As well as being configured to detect the earlier situations the spatial analyser 203 may be configured to detect, or at least identify, the situation where the sound is reproduced coherently from all (or nearly all) loudspeakers for creating an "inside-the-head" or "above" perception.

In some embodiments spatial analyser 203 may be configured to sort, the energies $E_i$, and the loudspeaker channel $i_e$ with the largest value determined.

The spatial analyser 203 may then be configured to determine the normalized coherence $c'_{ij}$ between this channel and $M_L$ other loudest channels. These normalized coherence $c'_{ij}$ values between this channel and $M_L$ other loudest channels may then be monitored. In some embodiments $M_L$ may be $N_L-1$, which would mean monitoring the coherence between the loudest and all the other loudspeaker channels. However, in some embodiments $M_L$ may be a smaller number, e.g., $N_L-2$. Using these normalized coherence values, the coherence analyser may be configured to determine a surrounding coherence parameter $\gamma$ using the following expression:

$$\gamma = \min_M (c'_{i_e,j}),$$

where $c'_{i_e,j}$ are the normalized coherences between the loudest channel and $M_L$ next loudest channels.

The surrounding coherence parameter $\gamma$ has values from 0 to 1. A value of 1 means that there is coherence between all (or nearly all) loudspeaker channels. A value of 0 means that there is no coherence between all (or even nearly all) loudspeaker channels.

The above expression is only one example of an estimate for a surrounding coherence parameter $\gamma$, and any other way can be used, as long as it complies with the above definition of the parameter.

The spatial analyser 203 may be configured to output the determined coherence parameters spread coherence parameter $\zeta$ and surrounding coherence parameter $\gamma$ to the spatial parameter set configurator 207.

Therefore, for each sub band k there will be collection of spatial audio parameters associated with the sub band and sub frame n. In this instance each sub band k and sub frame n (in other words a TF tile) may have the following spatial parameters associated with it on a per audio source direction basis; at least one azimuth and elevation denoted as azimuth $\phi(k,n)$, and elevation $\theta(k,n)$, surrounding coherence ($\gamma(k,n)$) and spread coherence ($\zeta(k,n)$) and a direct-to-total-energy ratio parameter $r(k,n)$. Obviously if there is more than one direction per TF tile, then the TF tile can have each of the above listed parameters associated with each sound source direction. Going forward, the above parameters may be termed a set of spatial audio parameters (or a spatial audio parameter set) for a particular TF tile.

In embodiments the spatial parameter set configurator 207 can be arranged to analyse the incoming spatial audio parameters in order to determine whether the number of spatial audio parameter sets can be reduced for the frame. The derived configuration information may then be passed to a spatial parameter set reducer 209. In embodiments the spatial parameter set reducer 209 may be arranged to reduce the number of sets of spatial audio parameters over the course of a time frame and/or frequency band and/or number of sound source directions. This reduction process may be performed based on the configuration information from the spatial parameter set configurator 207.

With respect to FIG. 2, the spatial parameter set configurator 207 is depicted as receiving a configuration input 211 which may be used to set the target bit rate for the frame. This parameter may vary on a per frame basis and can be used to determine at what level the number of sets of spatial audio parameters should be reduced in order to meet the target bit rate for the time frame.

In order to reduce the number of sets of spatial audio parameters the spatial parameter set configurator 207 may be arranged to check for similarity between the sets of spatial audio parameters across the subframes which constitute the time frame. In a typical case there may be 4 subframes covering 5 ms each for a 20 ms time frame. If it is determined by the spatial parameter set configurator 207 that the spatial audio parameters of each set of spatial audio parameters are all similar for all frequency sub bands, then all sub frames in the frame may be represented by a single set of spatial audio parameter for the frequency sub band k. In this instance the spatial parameter set configurator 207 has reduced the sets of spatial audio parameters for the subframes of the frame for all frequency sub bands to a single set of spatial audio parameters. Obviously other patterns of reduction may be deployed. For instance, neighbouring sets of spatial audio parameters may be found to be more similar to each other than other subframes in the frame. In this instance the neighbouring sets of spatial audio parameters may be reduced to one set of spatial audio parameter. In this scenario there may be more than one sets of "reduced" spatial audio parameters for the time frame across the frequency sub bands of the frame.

In the case the spatial parameter set configurator 207 has determined that there is enough similarity between the sets of spatial audio parameters across either all subframes of the frame or at least some of the subframes of the frame, the spatial parameter set reducer 209 may then be arranged to replace the spatial audio parameter sets which have been determined to be similar with a single spatial audio parameter set. In some embodiments the spatial audio parameter sets of the subframes which have been determined to be similar in a frame may all be replaced with the values of the first spatial audio parameter set. Therefore in the above example of four subframes per frame, and in the situation that the spatial parameter set configurator 207 determines that all the spatial audio parameter sets of all four subframes are deemed to be similar, then the spatial audio parameter set reducer 209 may be arranged to reduce all four spatial audio parameter sets (associated with the four subframes) to single spatial audio parameter set having the parameter values of the first spatial audio parameter set. In other words, for this example, each of the subframes of the frame may take the value of the spatial audio parameter set of the first sub frame. It is to be understood that other embodiments may not necessarily use the values of the spatial audio parameters of the first subframe of a run of contiguously determined similar subframes for the spatial audio parameter set of all the subframes in the run. For instance, the values of the spatial audio parameter set of any other of the subframes which have been determined to be similar can be used as the spatial audio parameter set for each of the subframes in the run of similar sub frames.

In other embodiments the run of similar subframes may span over one or more frames.

In other embodiments the spatial audio parameter sets of the run of contiguously determined similar subframes may be replaced by a merged spatial audio parameter set, in which the spatial audio parameters of all determined similar subframes may be merged into a single spatial audio parameter set. Techniques by which the spatial audio parameters may be merged are described in the patent application number GB1919130.3.

The spatial parameter set configurator 207 can also be arranged to check for similarity between the sets of spatial audio parameters across the frequency sub bands of the frequency band. For instance, taking the example of a TF tile having 24 frequency sub bands, i.e., k spans from 0 to 23. The spatial audio parameter set for each of the 24 frequency sub bands may be reduced into a fewer number of spatial audio parameters sets covering the number of frequency sub bands on a per sub frame basis. Consequently, "runs" of contiguous frequency sub bands can be assigned the same set of spatial audio parameters, thereby reducing the overall bit rate required to encode the spatial audio parameter sets across the frequency sub bands k.

As above, when spatial parameter set configurator 207 determines that the spatial audio parameter sets associated with a run of contiguous frequency sub bands are deemed to be similar, then the spatial parameter set reducer 209 may assign all the frequency bands of the run to have the spatial audio parameter set values of the first frequency sub band in the run. However, it is to be understood that other embodiments could take the spatial audio parameter set values of any other member of the contiguous run as the "unified" spatial audio parameter set for the run.

Similarly, in other embodiments the spatial audio parameter sets of the run of contiguously determined similar frequency sub bands may be replaced by a merged spatial audio parameter set, in which the spatial audio parameters of all determined similar frequency sub bands may be merged into a single spatial audio parameter set. Again, techniques whereby the spatial audio parameters may be merged across multiple frequency sub bands may be found in the description of the patent with application number GB1919130.3.

In embodiments the spatial parameter set configurator 207 may also be arranged to determine if any reduction in the number of audio source directions may be applied on a frequency band and/or time frame basis. In other words, should the spatial parameter set configurator 207 determine that a particular audio direction is found to be redundant, then the spatial audio parameter sets corresponding to the frequency sub bands of the frequency band and/or the spatial audio parameter sets corresponding to the sub frames of the frame for the particular audio direction may be removed from the spatial audio metadata.

In terms of MASA, this would mean that there may be a reduction from 2 directions to 1 direction for the run subframes of a frame or the run of sub bands of the frequency band. Which would result in just one spatial audio parameter set per TF tile rather than two spatial audio parameter sets per TF tile for those TF tiles constituting the run of sub frames and/or the run of frequency sub bands. In one example in which the audio frame may be divided into 96 TF subframes/tiles, in other words 4 time-domain subframes with 24 frequency sub bands, the spatial audio parameter set reducer 209 may be arranged so that all TF tiles have one spatial audio parameter set in the event that the TF tiles are determined to have one "effective" audio source direction.

In embodiments, the spatial audio parameter set configurator 207 can be arranged to determine whether the number of audio source directions can be reduced for a particular TF tile by firstly determining whether each concurrent audio source directions of the TF tile have a contributory effect to the audio sound scene. This can be determined by checking the direct-to-total energy ratio value for each direction. If at this point the spatial audio parameter set configurator 207 finds that the direct-to-total energy ratio value for a particular direction is zero or close to zero then the spatial audio parameter set configurator 207 may conclude that this particular audio source has no or very little contribution to any output signal. Consequently, the spatial audio parameter set reducer 209 may be arranged to remove the spatial audio parameter set associated with the non-contributing direction from the spatial audio parameter sets of at least the TF tile. Furthermore, the spatial audio parameter set reducer 209 may be arranged to remove the spatial audio parameter sets of the particular direction for all TF tiles across the subframes of the frame, or the frequency sub bands of the frequency band, or all TF tiles associated with the frame.

Another method which may be deployed by the spatial audio parameter set configurator 207 in order to determine a redundant audio source direction for a TF tile may be based comparing the sets of spatial audio parameters with each other for the TF tile. This may be performed by comparing term wise azimuth $\phi(k,n)$, and elevation $\theta(k,n)$ the surrounding coherence $(\gamma(k,n))$ and spread coherence $(\zeta(k,n))$ associated with each direction in order to determine if the two sets are similar to each other. If this is the case, then one of the spatial audio parameter sets may be retained with the addition of modifying the direct-to-total-energy ratio of the retained spatial audio parameter set. In embodiments the direct-to-total-energy ratio may be modified by taking the sum of the direct-to-total energy ratios associated with each similar direction.

In embodiments the spatial audio parameter set configurator 207 may use a relatively straight forward measure to indicate the similarity between the parameters of one spatial audio parameter set to another spatial audio parameter set. In a strict sense the similarity measure may be implemented as $x_1(i,j,k)=x_2(i,j,k) \forall i,j,k$, where x is a spatial audio parameter such as azimuth $\phi(k,n)$, elevation $\theta(k,n)$, direct-to-total ratio $r(k,n)$, surrounding coherence $(\gamma(k,n))$ and spread coherence $(\zeta(k,n))$ metadata parameter and i,j,k may be indices for time subframe, frequency band, and concurrent spatial direction respectively.

Alternatively, the spatial audio parameter set configurator 207 may use a less strict comparison measure in order to determine spatial audio parameter similarity. In embodiments this may be expressed as $|x_1(i,j,k)-x_2(i,j,k)|<c_x \forall i,j,k$ where $c_x$ is a parameter specific tolerance. This parameter specific tolerance may be derived from the expected (or maximum) accuracy of the quantizer in the encoder for the specific parameter.

Returning to FIG. 2, the spatial audio parameter set configurator 207 is depicted as accepting an input parameter which indicates the target bit rate for the frame. The spatial audio parameter set configurator 207 can then use this target bit rate parameter to adjust the number of unique spatial audio parameter sets per frame such that the target bit rate is met. The spatial audio parameter set configurator 207 may perform this operation by reducing the number of spatial audio parameter sets for either the sub frames of the frame, and/or the number of frequency sub bands of the frame, and/or the number of audio source directions per TF tile by using one or a combination of the spatial audio parameter set reduction strategies outlined above.

The upper limit required to represent the spatial audio parameter metadata will be determined by the number of sub frames per time frame, the number of frequency sub bands for the frame and the number of sound source directions per TF tile. For instance, in the example of MASA for IVAS, there are 4 subframes per frame and 24 frequency sub bands and each TF tile can have up to 2 individual audio source directions which would result in a maximum 192 spatial audio parameter sets per frame which may be too high for a specified target bit rate.

Accordingly, the spatial audio parameter set configurator 207 may deploy a process to incrementally adapt the number of spatial audio parameter sets by using a combination of reducing the spatial audio parameters sets across the sub frames, and/or frequency sub bands and/or audio source directions as described above.

Figure 3:
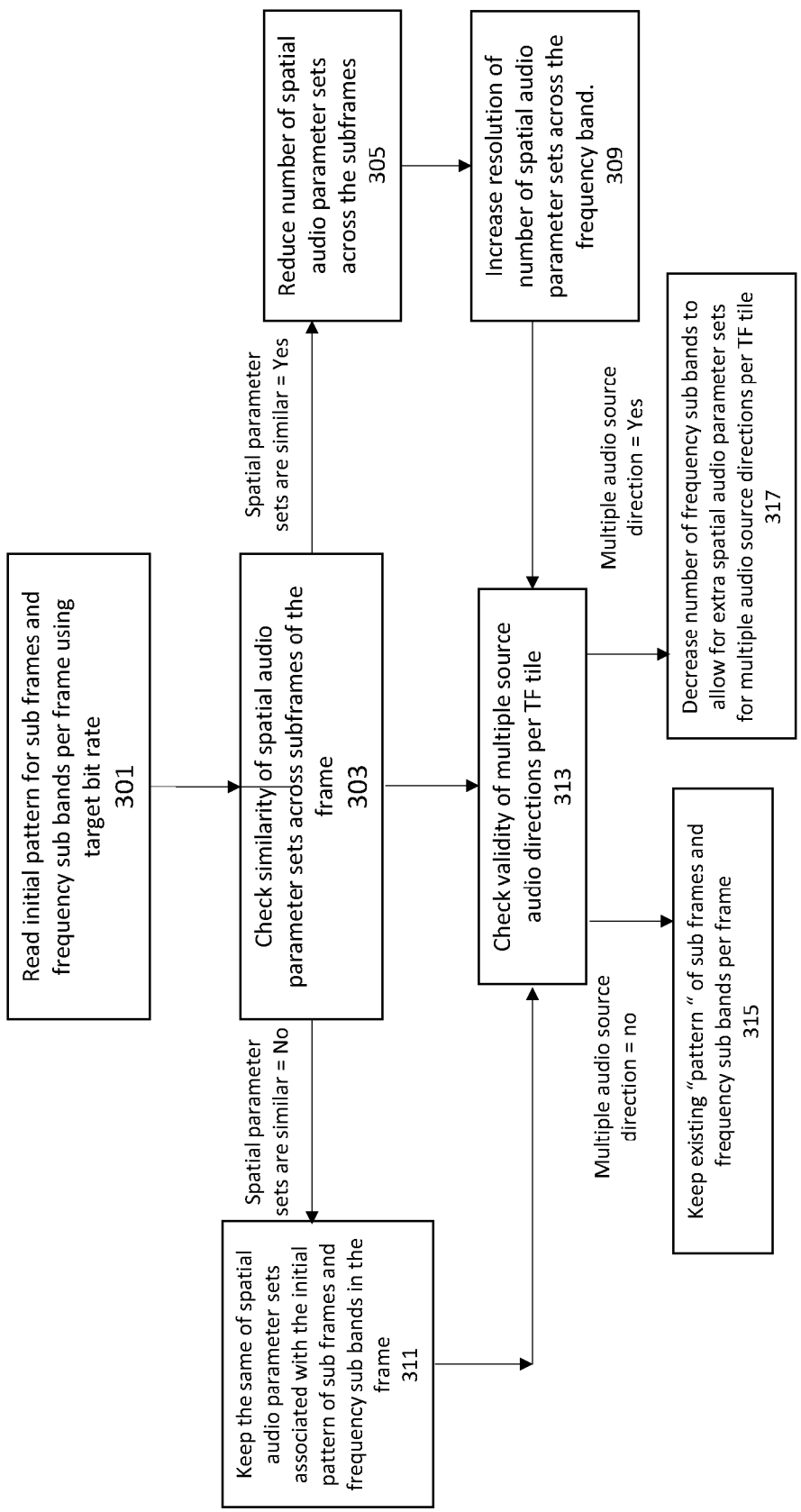
FIG. 3 shows a flow diagram of the operation of the metadata encoder as shown in FIG. 2 according to some embodiments.

One such process may be depicted by FIG. 3 and may comprise the step of having an initial condition for the number of spatial audio parameter sets. The initial condition may be determined by the value of the target bit rate for the frame as specified in the signalling input of the spatial audio parameter configurator 207. The initial condition may be expressed as an initial value for the number of spatial audio parameter sets for the frame in in terms of the number of sub frames and frequency sub bands. For instance, a working example for MASA and IVAS might have a starting condition of spatial audio parameters sets for four sub frames and 8 frequency sub bands. It is to be understood that there may be different initial conditions (in terms of the number of unique spatial audio parameter sets) for different ranges of target bit rates. These various initial conditions may be stored in the form of a table, whereby each entry of the table is associated with a target bit rate or target bit rate range.

This processing step is shown in FIG. 3 as step 301, where it can be seen that the target bit rate is read in order to determine an initial pattern (or starting pattern) of sub frames and frequency sub bands (and consequently the initial allocation of spatial audio parameter sets) for the frame.

Once the initial number of unique spatial audio parameter sets have been determined the spatial parameter set configurator 207 may then check the similarity between the sets of spatial audio parameters across the subframes of the frame for the initial number of frequency sub bands. If the spatial audio parameter sets for the sub frames across the frame over the initial number of frequency sub bands are found to be similar according to one of the above described criterium, then all the subframes may be reduced to one subframe across all the frequency sub bands. Returning to the MASA example above in this instance the four subframes may be reduced to one subframe (i.e. a frame) for the 8 frequency sub bands.

Returning to FIG. 3 the processing step of determining the similarity of spatial audio parameter sets across the sub frames of the frame is shown as processing step 303. The processing step of reducing the number of spatial audio parameter sets across the sub frames of the frame (or effectively reducing the number of sub frames which have unique spatial audio parameter sets) is shown as process step 305, when the spatial audio parameter sets have been determined to be similar across the run of sub frames.

The determination by the spatial audio parameter configurator 207 of a run of similar spatial audio parameter sets similar across a number of subframes may result in an increase of resolution of the sub bands along the frequency scale. In other words, the number of spatial audio parameter sets across the frequency band can be increased. Returning to the above MASA example this step may result in the number of frequency bands being increased to 24. That is the structure of the frame has been changed to one frame along the time axis and 24 sub bands along the frequency axis. Consequently, there is now a spatial audio parameter set for each of the 24 frequency sub bands. Processing step 309 in FIG. 3 depicts an increase in resolution along the frequency band by increasing the number of frequency sub band spatial audio parameter sets.

Returning to FIG. 3 the processing step of determining the similarity of spatial audio parameter sets across the sub frames of the frame is shown as processing step 303. The processing step of reducing the number of spatial audio parameter sets across the sub frames of the frame (or effectively reducing the number of sub frames which have unique spatial audio parameter sets) is shown as process step 305, when the spatial audio parameter sets are similar across the run of sub frames.

However, should the similarity check indicate that there is no similarity between the sub frames of the frame along the time axis, then the spatial parameter set configurator 207 may be arranged to keep the initial pattern of sub frames and frequency bands. In this case of the above MASA example can result in the spatial parameter set configurator 207 maintaining the pattern of four subframes and 8 frequency sub bands. This is shown in FIG. 3 as the processing step 311.

The spatial parameter set configurator 207 may then be arranged to determine the validity of multiple audio source directions for the TF tiles associated with the subframes and frequency sub bands of the frame. This, as explained above, can be done by checking whether the concurrent directions associated with the TF tiles are valid. If the checking step does indicate that any directions associated with the TF are valid in the sense that they are distinct directions which contribute to the sound scene, then the spatial parameter set configurator 207 may be arranged to accommodate having multiple sets of spatial audio parameter sets (one for each direction) for each sub band/subframe combination by reducing the number of frequency sub bands. With respect to FIG. 3, the processing step of determining the validity of more than one sound source direction per TF tile is shown as step 313.

The extra bandwidth freed up by reducing the number of frequency sub bands may be allocated for transmitting the extra spatial audio parameter sets required to represent the multiple sound source directions. In other words, by reducing the number of frequency sub bands, results in a reduced number of spatial audio parameter sets commensurate with the "pattern" of TF tiles of the "reduced" number of sub-frames and "reduced" number of frequency sub bands of the frame. The remaining TF tiles can then each have spatial audio parameter sets associated with multiple directions. In terms of IVAS and MASA, a reduction of three frequency sub bands was found to be sufficient in order to allow two sound sources per remaining TF tile of the frame. The efficiency may be improved further by merging the spatial audio parameter set for each direction of each (remaining TF tile) in accordance with the description of patent application number GB1919130.3.

In accordance with the above paragraph, FIG. 3 depicts the step of reducing the number of frequency sub bands to accommodate the extra spatial audio parameter sets in the case of multiple sound source directions per TF tile as processing step 317. FIG. 3 shows the case of the determination that the TF tiles of the frame are not suited to having the spatial audio parameter sets related to multiple directions as processing step 315.

Further embodiments may additionally check for the presence of coherence parameters (surrounding coherence and spread coherence) in each spatial audio parameter set. If it is determined that there is no coherence parameters (either surround or spread coherence) then the extra coding bandwidth required to represent these parameters may be allocated elsewhere. For instance, the extra bandwidth may be allocated to increasing the number of frequency sub bands, that is increasing the number of spatial audio parameter sets across the frequency axis.

Signalling may be used to inform a decoder that duplication of spatial audio parameter sets is required in order to maintain the granularity of sub frames as originally deployed at the encoder (before the process of spatial audio parameter set reduction). For instance if the above algorithm has determined that there may be a reduction along the number of subframes, such as one spatial audio parameter set is used along the time axis for the sub frames of the time frame (it is to be understood that there will be spatial audio parameter sets corresponding to the frequency sub bands along the frequency axis). Then at the decoder a duplication operation is required whereby the spatial audio parameter set is duplicated across the number of sub frames along the time frame axis. Furthermore, signalling may also be required in order that the decoder will "know" how to decode the incoming bitstream. In embodiments this may be signalled by a single bit to signify whether there the frame is represented by one spatial audio parameter set or four spatial audio parameter sets along the time axis.

Further signalling may entail one bit to signal the presence of concurrent directions. The scope of the one bit may encompass all TF tiles in the frame. That is the one bit indicates whether all TF tiles have one audio source direction or two audio source directions. A further bit may be used signal the presence of coherence parameters, on a frame basis.

Alternate embodiments may have a signalling structure on a TF tile basis. However, this approach would lead to a greater bit rate.

The metadata encoder/quantizer 111 may comprise a direction encoder. The direction encoder 205 is configured to receive direction parameters (such as the azimuth $\phi$ and elevation $\theta$)(and in some embodiments an expected bit allocation) and from this generate a suitable encoded output. In some embodiments the encoding is based on an arrangement of spheres forming a spherical grid arranged in rings on a 'surface' sphere which are defined by a look up table defined by the determined quantization resolution. In other words, the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

The metadata encoder/quantizer 111 may comprise an energy ratio encoder. The energy ratio encoder may be configured to receive energy ratios r and determine a suitable encoding for compressing the energy ratios for the merged sub-bands and/or merged time-frequency blocks.

Similarly, the metadata encoder/quantizer 111 may also comprise a coherence encoder which is configured to receive the surround coherence values $\gamma$ and spread coherence values $\zeta$ and determine a suitable encoding for compressing the surround and spread coherence values.

The encoded merged direction, energy ratios and coherence values may be passed to the combiner 211. The combiner is configured to receive the encoded (or quantized/compressed) merged directional parameters, energy ratio parameters and coherence parameters and combine these to generate a suitable output (for example a metadata bit stream which may be combined with the transport signal or be separately transmitted or stored from the transport signal).

In some embodiments the encoded datastream is passed to the decoder/demultiplexer 133. The decoder/demultiplexer 133 demultiplexes the encoded the quantized spatial audio parameter sets for the frame and passes them to the metadata extractor 137 and also the decoder/demultiplexer 133 may in some embodiments extract the transport audio signals to the transport extractor for decoding and extracting.

In embodiments the decoder/demultiplexer 133 may be arranged to receive and decode the signalling bits indicating whether any of the spatial audio parameter sets need to be replicated across the sub frames to compensate for any spatial audio parameter set reduction performed across the frame at the encoder.

In the case of the signalling bit indicating that the spatial audio parameter sets have not reduced, the sets of received spatial audio parameters may be passed directly to the various decoders for decoding.

The decoded spatial audio parameters may then form the decoded metadata output from the metadata extractor 137 and passed to the synthesis processor 139 in order to form the multi-channel signals 110.

Figure 4:
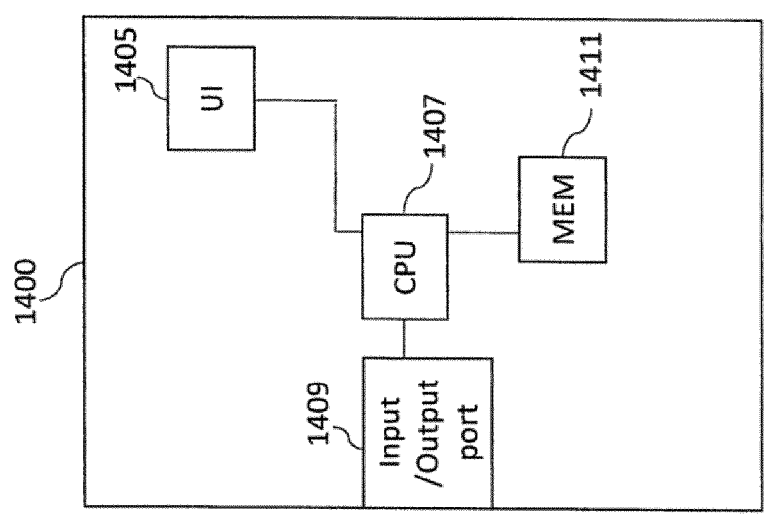
FIG. 4 shows schematically an example device suitable for implementing the apparatus shown.

With respect to FIG. 4 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for spatial audio encoding comprising at least one processor and at least one memory including computer program code, the at least one memory and the computer program code configured to, with the at least one processor, cause the apparatus to at least:
   obtain a plurality of spatial audio parameter sets for a time-frequency tile of a frame of one or more audio signals, wherein a plurality of sound source directions are associated with the time frequency tile, and wherein each spatial audio parameter set is associated with a different sound source direction;
   determine whether the plurality of sound source directions for the time frequency tile can be reduced by checking whether a direct-to-total energy ratio value of a spatial audio parameter set associated with a sound source direction is zero or close to zero; and
   responsive to determining that the direct-to-total energy ratio value associated with the sound source direction is zero or close to zero, remove the spatial audio parameter set associated with the sound source direction from the plurality of audio parameters sets associated with the time frequency tile.

2. The apparatus as claimed in claim 1, wherein parameters of respective ones of the plurality of spatial audio parameter sets further comprise at least one of:
   a direction vector comprising an azimuth value and an elevation value;
   a surrounding coherence value; and
   a spread coherence.

3. The apparatus as claimed in claim 1, wherein the initial number of spatial audio parameter sets for frequency sub bands of the frame is dependent on a target coding rate.

4. A method for spatial audio encoding comprising:
   obtaining a plurality of spatial audio parameter sets for a time-frequency tile of a frame of one or more audio signals, wherein a plurality of sound source directions are associated with the time frequency tile, and wherein each spatial audio parameter set is associated with a different sound source direction;

determining whether the plurality of sound source directions for the time frequency tile can be reduced by checking whether a direct-to-total energy ratio value of a spatial audio parameter set associated with a sound source direction is zero or close to zero; and responsive to determining that the direct-to-total energy ratio value associated with the sound source direction is zero or close to zero, removing the spatial audio parameter set associated with the sound source direction from the plurality of audio parameters sets associated with the time frequency tile.

5. The method as claimed in claim 4, wherein parameters of respective ones of the plurality of spatial audio parameter sets further comprise at least one of:

a direction vector comprising an azimuth value and an elevation value;

a surrounding coherence value; and a spread coherence.

* * * * *